(12) United States Patent
Hagen

(10) Patent No.: US 9,586,827 B2
(45) Date of Patent: Mar. 7, 2017

(54) CO2 PRODUCING CALCINER

(71) Applicant: David Leroy Hagen, Goshen, IN (US)

(72) Inventor: David Leroy Hagen, Goshen, IN (US)

( * ) Notice: Subject to any disclaimer, the term of this patent is extended or adjusted under 35 U.S.C. 154(b) by 0 days.

(21) Appl. No.: 14/480,582

(22) Filed: Sep. 8, 2014

(65) Prior Publication Data

US 2016/0083258 A1 Mar. 24, 2016

Related U.S. Application Data

(60) Provisional application No. 61/874,599, filed on Sep. 6, 2013.

(51) Int. Cl.
*B01J 6/00* (2006.01)
*C01B 31/20* (2006.01)
*C04B 2/10* (2006.01)

(52) U.S. Cl.
CPC ............... *C01B 31/20* (2013.01); *B01J 6/001* (2013.01); *B01J 6/004* (2013.01); *C04B 2/106* (2013.01); *Y02C 10/14* (2013.01); *Y02P 90/70* (2015.11)

(58) Field of Classification Search
CPC . B01J 6/001; B01J 6/004; Y02C 10/14; Y02P 90/70; E21B 43/164; C04B 2/106; C04B 2/12

See application file for complete search history.

(56) References Cited

U.S. PATENT DOCUMENTS

| 1,716,572 A | * | 6/1929 | Wright ................. C04B 2/12 423/176 |
|---|---|---|---|
| 2,212,446 A | | 8/1940 | MacIntire |
| 2,623,596 A | | 12/1952 | Whorton et al. |
| 3,811,502 A | | 5/1974 | Burnett |
| 4,226,839 A | | 10/1980 | O'Neill et al. |
| 4,377,066 A | | 3/1983 | Dickinson |

(Continued)

OTHER PUBLICATIONS

Chang, Ming-Hui et al. (2014) Design and Experimental Testing of a 1.9MWth Calcium Looping Pilot Plant, Energy Procedia 63 (2014) 2100-2108 doi:10.1016/j.egypro.2014.11.226 http://bit.ly/1nPyh4K.

(Continued)

*Primary Examiner* — Lessanework Seifu

(57) ABSTRACT

A system to calcine crushed carbonate, discharge alkaline oxide, and deliver an enhancing fluid having CO2, comprising: a pressurized insulated calciner having descendingly, a crushed alkaline carbonate feeder, a calciner fluid outlet manifold, a heated sideflow calciner fluid intake manifold, a preheated sideflow calciner fluid outtake manifold, a fluid inlet manifold to recirculate calciner fluid from the outlet manifold, and an alkaline oxide discharger; a pressurizer to repressurize sideflow calciner fluid, connected to intake and outtake manifolds; pressurizers to recirculate calciner outlet fluid to the inlet manifold, pressurize the calciner and deliver enhancing fluid comprising CO2; delivery and combustion systems to form a combustion fluid; a recuperating or regenerating refractory heat exchanger to heat sideflow calciner fluid with combustion fluid connected to the sideflow pressurizer, and fluid outtake and intake manifolds; and a controller operable to control combustion, heat exchange, calciner fluid formation and delivery, carbonate feed and oxide discharge.

15 Claims, 4 Drawing Sheets

(56) References Cited

U.S. PATENT DOCUMENTS

| | | | |
|---|---|---|---|
| 4,380,960 | A | 4/1983 | Dickinson |
| 4,389,381 | A | 6/1983 | Dinovo |
| 4,558,740 | A | 12/1985 | Yellig, Jr. |
| 4,609,043 | A | 9/1986 | Cullick |
| 4,643,252 | A | 2/1987 | Kovarik |
| 4,748,010 | A | 5/1988 | Walker |
| 5,050,375 | A | 9/1991 | Dickinson |
| 5,314,017 | A | 5/1994 | Schechter et al. |
| 5,503,226 | A | 4/1996 | Wadleigh |
| 6,667,022 | B2 | 12/2003 | Cole |
| 7,699,909 | B2 | 4/2010 | Lackner et al. |
| 7,814,975 | B2 | 10/2010 | Hagen et al. |
| 7,879,139 | B2 | 2/2011 | Anthony et al. |
| 7,976,628 | B2 | 7/2011 | Blount et al. |
| 8,047,007 | B2 | 11/2011 | Zubrin et al. |
| 8,110,012 | B2 | 2/2012 | Chiu et al. |
| 8,128,736 | B2 | 3/2012 | Satchell, Jr. et al. |
| 8,162,568 | B2 | 4/2012 | Goheen et al. |
| 8,501,105 | B2 | 8/2013 | Fan et al. |
| 8,561,702 | B2 | 10/2013 | Wylie et al. |
| 8,631,658 | B2 | 1/2014 | MacAdam et al. |
| 8,696,801 | B2 | 4/2014 | Eisenberger |
| 2003/0037928 | A1 | 2/2003 | Ramachandran et al. |
| 2005/0060985 | A1 | 3/2005 | Abanades et al. |
| 2007/0056487 | A1 | 3/2007 | Anthony et al. |
| 2009/0169462 | A1 | 7/2009 | Abanades |
| 2009/0208402 | A1 | 8/2009 | Rossi |
| 2009/0255444 | A1 | 10/2009 | Martinez |
| 2010/0314136 | A1 | 12/2010 | Zubrin et al. |
| 2010/0319586 | A1 | 12/2010 | Blount et al. |
| 2011/0113957 | A1 | 5/2011 | Sceats |
| 2012/0175136 | A1 | 7/2012 | Villareal et al. |
| 2015/0157978 | A1 | 6/2015 | Chen |

OTHER PUBLICATIONS

EIA (2013) Annual Energy Outlook, Market Trends Oil/Liquids, Energy Information Agency, Apr. 2013, National Energy Technology Laboratory, US Department of Energy DOE/EIA-0383(2013) pp. 55-90 http://1.usa.gov/1gndcZT.

EPA (2014) Carbon Pollution Emission Guidelines for Existing Stationary Sources: Electric Utility Generating Units—Proposed Rule 79 FR No. 117 Jun. 18, 34829-34958, US Environmental Protection Agency http://1.usa.gov/21ujA4g.

Folger, P. (2013) Carbon Capture: A Technology Assessment, CRS Report for Congress, Nov. 5, 2013, Congressional Research Service, 7-5700 R41325 https://www.fas.org/sgp/crs/misc/R41325.pdf.

McCoy, Sean T. (2009) The Economics of CO2 Transport by Pipeline and Storage in Saline Aquifers and Oil Reservoirs, Dept. Engineering and Public Policy, Paper 1, Carnegie Mellon University http://bit.ly/1RleZvN.

Sanna, A. et al. (2014) A review of mineral carbonation technologies to sequester CO2, Chem. Soc. Rev., Jul. 1, 2014, 43, 8049-8080 http://rsc.li/1PaHaMi.

SEC (2009) Securities and Exchange Commission, Federal Register / vol. 74, No. 9 / Wednesday, Jan. 14, 2009 / Rules and Regulations p. 2192; Undeveloped Oil and Gas Reserves [4-10(a)(31)]; Guidance (Question 131.03 in Oct. 26, 2009 CD&I) http://1.usa.gov/1RltYft.

Zeman, F. & Lackner, K. (2008) The Reduced Emission Oxygen Kiln, Jul. 31, The Earth Institute, Columbia University, New York, Report 2008.01 http://bit.ly/1RlhQ7V.

* cited by examiner

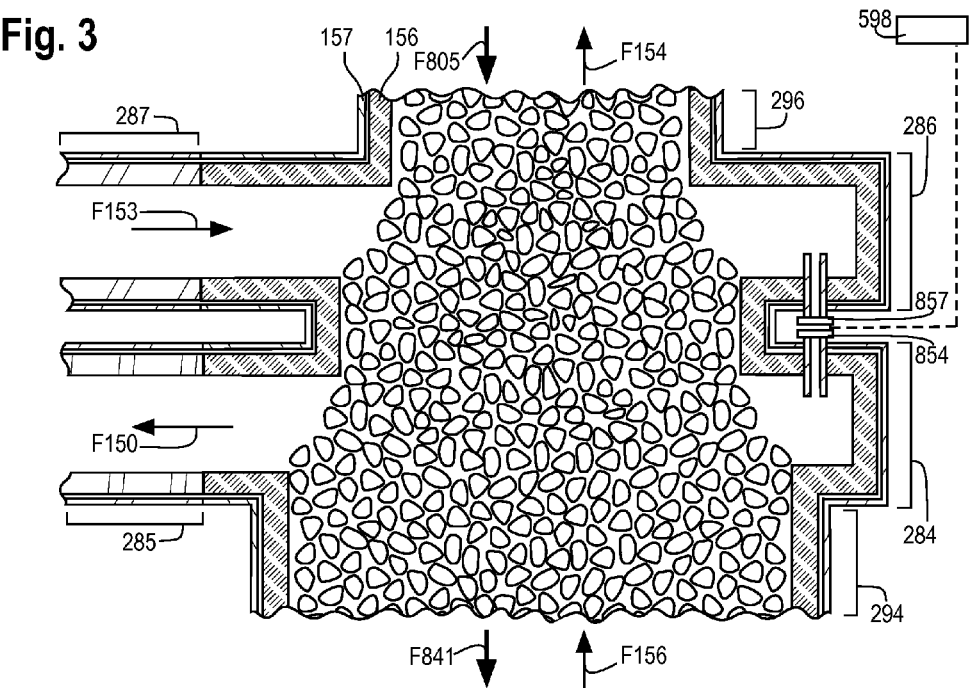
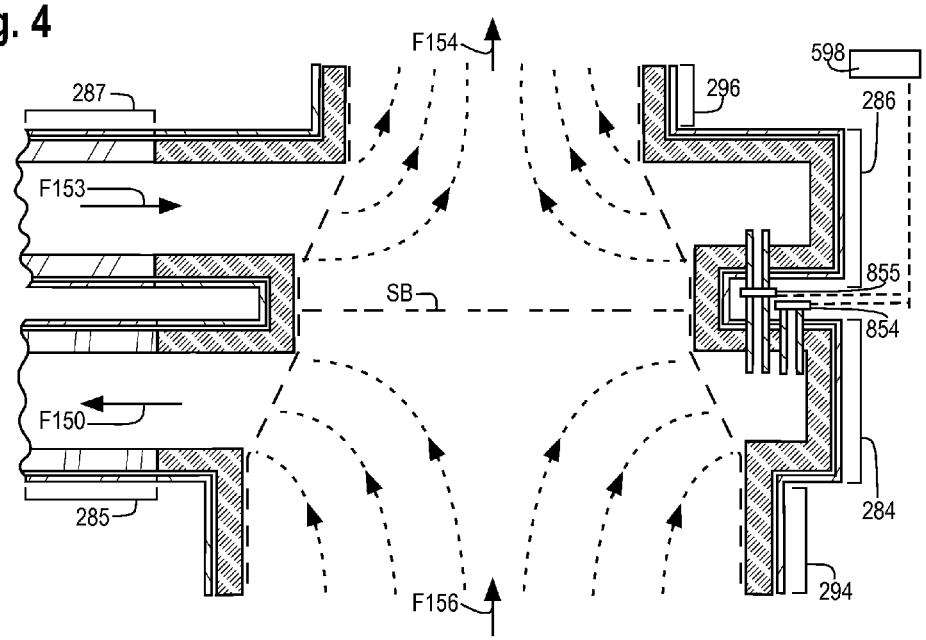

CO2 PRODUCING CALCINER

CROSS-REFERENCE TO RELATED APPLICATIONS

This application incorporates by reference a co-filed non-provisional patent application CALCINER ENHANCED OIL RECOVERY. This application claims priority to U.S. provisional patent application 61/874,560 of Sep. 6, 2013 titled Calciner Enhanced Oil Recovery, and to U.S. provisional patent application 61/874,599 of Sep. 6, 2013 titled CO2 Capture Calciner.

BACKGROUND OF THE INVENTION

1. Field of the Invention

Capturing and delivering carbon dioxide formed by calcining a carbonate.

2. Description of Related Art

The US 48 State domestic oil production peaked in 1970. Increasing fuel consumption with declining oil production has required growing oil imports until recently. The USA imported $10.3 trillion of oil from 1940 through 2011 (in 2011 US dollars), causing a similar net loss to its International Investment Position. The Energy Information Agency (herein "EIA") of the US Department of Energy (herein "DOE") projects the current increase in US oil production to peak about 2019 (EIA 2013). Water floods, gas floods of air, nitrogen, carbon dioxide (herein "CO2"), lighter hydrocarbons (such as methane and propane), water alternating gas (herein "WAG"), steam, surfactants, and/or foam have variously been used to enhance oil recovery or production (herein "EOR"), depending on resource depth, type and production. (Citations are detailed in References and Bibliography below.)

CO2-EOR: Using carbon dioxide to enhance oil recovery or production (herein "CO2-EOR") has been commercially proven for over four decades since 1972. Wallace et al. (2014) report 58 million metric tons/year (3.0 Bcfd) of CO2 use in 113 projects in the USA in 2012. Kuuskraa & Wallace (2014) report 136 US enhanced oil recovery projects (CO2-EOR) that were producing 300,000 bbl/day of oil. i.e. 4.0% of US 2013 domestic production of 7.4 million bbl/day. They project US CO2-EOR production to double by 2020 to 638,000 bbl/day. That would reduce the USA's 5.3 million bbl/day of oil imports by about 12%. Kuuskraa et al. (2011) screened 7,000 US oil fields to find about 2,000 oil fields that are economically suitable for CO2-EOR.

Kuuskraa et al. (2013) report that "Next Generation" CO2-EOR could provide at least 100 billion bbl (13 billion metric ton) in economically recoverable US oil resources including CO2-EOR recovery from residual oil zones (herein "ROZ") with at $85/bbl oil, $40/metric ton CO2 (about $2/Mscf) and a 20% Internal Rate of Return (herein "IRR") before tax. Such economic Next Generation CO2-EOR oil would nominally need 33 billion metric ton of CO2 of which 30 billion needs to come from industrial/power sources. Wallace (2014) reports about 135 billion barrels (19 billion metric tons) of economically and technically recoverable conventional US oil using "Next Generation" Enhanced Oil Recovery, including ROZ, Alaska and offshore Gulf of Mexico. Such CO2-EOR could use 45 billion metric ton (t or "tonne") of CO2. Kuuskraa et al. (2013) project 1,297 billion bbl technical global CO2-EOR oil recovery potential.

CO2 Shortage: However only about 2.3 billion metric ton of CO2 are conventionally available for this Next Generation EOR from existing natural and anthroprogenic sources (7% of that needed for the US identified economic EOR oil potential). While CO2-EOR provides about 4.5% of US production, ARI (2010) identified: "The single largest barrier to expanding CO2 flooding today is the lack of substantial volumes of reliable and affordable CO2." Kuuskraa et al. (2011) affirmed that: " . . . the number one barrier to reaching higher levels of CO2-EOR production is lack of access to adequate supplies of affordable CO2." Melzer (2012) observed: "Depletion of the source fields and/or size limitations of the pipelines are now constricting EOR growth . . . . The CO2 cost gap between industrial CO2 and the pure, natural CO2 remains a barrier." Trentham (2012) observed "Accelerated ROZ deployment has clearly created unprecedented supply problems; many other unlisted projects await CO2 availability to begin implementation." Godec (2014) states: "The main barrier to . . . CO2 EOR is insufficient supplies of affordable CO2" and that new industrial sources need to be developed to supply 17 of 19 billion metric tons of CO2 required to recover 66 billion bbl of conventional economically recoverable US CO2-EOR oil.

The Energy Information Agency (2014) projects that because of CO2 shortages, CO2-EOR will only increase to about 0.74 million barrels per day by 2040, enabling 5.2 billion bbl CO2-EOR oil for 2013-2040. Compare, about 1.5 billion bbl CO2-EOR oil produced from 1972 to 2012. The remaining 94% of identified economic CO2-EOR resources require developing major new industrial CO2 sources.

Cement CO2: With about 5% of global CO2 generation, the cement industry is nominally a potential source of industrial CO2. In EPA (2010), the Environmental Protection Agency reviews alternatives for reducing cement industry emissions. However, reviews of CO2 supplies for CO2-EOR do not mention current or planned CO2 sources from lime or cement production. The EIA expects that any development of CO2 from cement plants would take seventeen years from development to significant market penetration (seven years development followed by ten years for market acceptance). The EIA projects only 4% of Estimated Ultimate Recovery (EUR) of such CO2-EOR with CO2 from cement might be achieved.

Economic constraints: In mature calcining markets, such as for commodity lime and cement, economic downturns drop product demand causing strong declines in profitability often forcing operators to idle calciners. US cement production dropped 33% from 2007 to 2009 and a drop in price from $104 to $90 by 2011, causing plant closures and idled kilns. The EIA (2012) projected that capturing CO2 from cement plants, compressing it, and delivering it to an CO2-EOR project site via pipeline would cost more than twice that of conventional CO2 delivery from Natural Gas Processing ($4.29/Mscf vs $1.92/Mscf). Capturing CO2 from pulverized coal plants was projected to cost even more, while increasing electricity costs more than 30%.

Location & pipelines: Cement and lime kilns are almost always located close to or near to population centers or major industrial users. However, most oil fields are in geological basins distant from such population centers or industrial manufacturers. Conventional petroleum practice uses pipeline CO2 delivery as the lowest cost means to transport CO2 from natural or anthroprogenic sources to CO2-EOR oilfields. Conversely, the limestone or lime transport distance is minimized, as lime and limestone are more costly to transport than delivering CO2 by gas pipeline. While the US has some 805,000 km (500,000 miles) of natural gas pipelines, More than one billion dollars worth of natural gas was flared from the Bakken oil field in North Dakota in 2012—for lack of natural gas pipelines. Furthermore, the USA only has about 5,800 km (3,600 miles) of CO2 pipelines.

Industry analysts predict that expanding CO2-EOR would require building a major new CO2 pipeline infrastructure from anthroprogenic sources to CO2-EOR oil fields including mature oil fields, "brownfield" residual oil zones (herein "brownfield ROZ") below the Main Pay Zone ("MPZ") in conventional oil fields, and "greenfield" residual oil zones (herein "greenfield ROZ") separate from conventional oil fields not having mobile oil readily accessible by conventional primary oil production. Not In My Backyard (NIMBY) and environmental litigation delay pipelines. The typical time for permitting and constructing CO2 pipelines would seriously delay CO2-EOR projects. Waiting for CO2 pipelines would cause lost development opportunities causing greater wealth loss from fuel imports.

Calciners and surface miners: Industry practice is to permanently install cement and lime calciners near large population centers or industrial markets with multi-decadal operating lives. Today's large rotary surface miners far exceed the production capacity of calciners. For example, a large surface miner with a capacity of 400 to 3,600 metric ton/hour, might only take 10 to 90 minutes to produce a day's worth of limestone for a 600 metric ton/day lime kiln. Surface miners are typically operated on mining projects or on very large limestone resources near railways or rivers to transport crushed rock to major markets sufficient to support their rapid production.

Public carriers: In Texas, public carriers seeking to pipeline carbon dioxide must now find and document third party customers before they can apply for eminent domain access. Conversely, parties seeking public carrier carbon dioxide for CO2-EOR usually must financially commit to a pipeline with a long wait for uncertain delivery dates. The DOE (2012) only expects fields having more than 20 million barrels of original oil in place (OOIP) to be practical for CO2-EOR. These chicken-egg barriers strongly reduce the Return On Investment (ROI) for CO2-EOR projects from cement plants and constrain the potential oil production by CO2-EOR.

Environmental barriers: Regulators are imposing increasingly stringent emissions limits. The Environmental Protection Agency's proposed rule for cement kiln emissions (EPA 2013) will require further expensive plant modifications. With overcapacity and low prices, the calcining industry is not expected to build new capacity to capture CO2. Reviews of CO2 capture technology note high costs, risks, and large energy requirements. Such poor economics and contrary markets raise major barriers against delivering CO2 for CO2-EOR from conventional calciners. In 2012, none of the DOE's CO2-EOR planned demonstration projects included carbon capture from lime kilns or cement plants.

Global Warming regulations: Lobbyists emphasizing projected dangers of catastrophic anthroprogenic global warming are pressuring politicians and environmental agencies towards global warming mitigation, carbon sequestration, and major reductions in carbon dioxide generation. For example, the Environmental Protection Agency is promulgating greenhouse gas emission regulations for current and future electric power plants (EPA 2012B, 2014) that strictly limit CO2 emissions of current and future coal-fired electricity power plants likely necessitating CO2 sequestration. Conventional calcining typically generates two orders of magnitude higher NOx production per unit of energy use than gas turbine power generation. The EPA's proposed stringent new rules on coal emissions and likely future NOx and calcining restrictions will likely substantially increase calcining plant capital and operating costs and delay issuance of plant permits. Calcining by oxicombustion is being studied.

Industry structure: Carbon dioxide is commonly assumed to be obtained as a commodity product at the lowest bid commanding only about 10% of the enhanced oil recovery margin. This provides little incentive to develop CO2 supplies. While hydrocarbon resources are drilled to prove hydrocarbon reserves, the quantity of limestone resources are commonly ignored.

Other Regulations: The Society of Petroleum Engineers et al. (SPE et al. 2011) provide guidelines for evaluating CO2-EOR reserves. However, the US Securities and Exchange regulations (SEC 2009) on declaring unconventional reserves normally permit declaring only those reserves that will be developed within five years at previously demonstrated development rates. The SEC further requires proof of enhanced reservoir response in the same reservoir or an analogous reservoir. However, it has commonly taken from two to ten years to prove reservoir response from the start of injecting CO2 for enhancing oil recovery (with an occasional demonstration in one year). The USA built the trans-continental railroad in six years (1683-1689), starting during a civil war. However, the US DOE now reports that the time from resource discovery to permit issuance alone takes seven to ten years. Such delays in permitting cause a "Catch 22" confounding regulatory problem: Common permitting and construction times to establish full scale CO2-EOR delivery projects needed to count reserves are longer than the SEC prescribed five years from the evidence of CO2 response required to demonstrate those reserves.

REFERENCES AND BIBLIOGRAPHY

ARI (2010) U.S. Oil Production Potential from Accelerated Deployment of Carbon Capture and Storage, White Paper, Advanced Resources International, Inc., Arlington, Va. USA Mar. 10, 2010.

DiPietro, P., et al. (2012) A Note on Sources of CO2 Supply for Enhanced-Oil-Recovery Operations, SPE Economics & Management, April 2012, 69-74.

DiPietro, P. (2013) Carbon Dioxide Enhanced Oil Recovery in the United States, National Energy Technology Laboratory, US Dept. of Energy, presentation Jun. 11, 2013.

DOE (2012) United States Carbon Storage Utilization and Storage Atlas (IV), November 2012 US Dept. of Energy, NatCarb Viewer http://www.NatCarbViewer.com EIA (2012) Assumptions to the Annual Energy Outlook 2011, Energy Information Agency, US Dept. of Energy.

EIA (2013) Market Trends Oil/Liquids, Annual Energy Outlook, Energy Information Agency, April, 2013, National Energy Technology Laboratory, US Dept. of Energy DOE/EIA-0383(2013)

EIA (2014) Annual Energy Outlook 2014 with projections to 2040. DOE/EIA-0383.

EPA (2010) Available and Emerging Technologies for Reducing Greenhouse Gas Emissions from the Portland Cement Industry, Office of Air and Radiation, US Environmental Protection Agency.

EPA (2012) Regulatory Impact Analysis for the Proposed Standards of Performance for Greenhouse Gas Emissions for New Stationary Sources: Electric Utility Generating Units. EPA-452/R-12-001.

EPA (2013) National Emission Standards for Hazardous Air Pollutants for the Portland Cement Manufacturing Industry and Standards of Performance for Portland Cement Plants: Final rule 78 FR No. 29, Feb. 12, 2013, 10006-10054.

EPA (2014) Carbon Pollution Emission Guidelines for Existing Stationary Sources: Electric Utility Generating Units—Proposed Rule 79 FR No. 117 Jun. 18, 2014, 34829-34958.

Folger, P. (2013) Carbon Capture: A Technology Assessment, Congressional Research Service Godec, M. (2014) Carbon Dioxide Enhanced Oil Recovery: Industrial CO2 Supply Crucial For EOR, American Oil & Gas Reporter, February 2014 www.aogr.com Hoenig, V; Hoppe H.; & Emberger, B. (2007) Carbon Capture Technology—Options and Potentials for the Cement Industry. PCA R&D Serial No. 3022, European Cement Research Academy EPA (2013) National Emission Standards for Hazardous Air Pollutants for the Portland Cement Manufacturing Industry and Standards of Performance for Portland Cement Plants: Final rule 78 FR No. 29, Feb. 12, 2013, 10006-10054.

Inventys—CO2 capture for $15 per tonne, Carbon Capture J. January/February 2011 #19 pp 5-6

Kuuskraa, V. A., et. al. (2011) Improving Domestic Energy Security and Lowering CO2 Emissions with "Next Generation" CO2-Enhanced Oil Recovery (CO2-EOR), Jun. 20, 2011 DOE/NETL-2011/1504

Kuuskraa, V. A., Godec, M. L. & DiPietro, P. (2013) CO2 Utilization from "Next Generation" CO2 Enhanced Oil Recovery Technology, Energy Procedia 37(2013) 6854-6866.

Kuuskraa, V. A., Wallace, M. (2014) CO2-EOR set for growth as new CO2 supplies emerge Oil & Gas Journal, Apr. 7, 2014

McCoy, Sean T. (2009) The Economics of CO2 Transport by Pipeline and Storage in Saline Aquifers and Oil Reservoirs, Dept. Engineering and Public Policy, Paper 1, Carnegie Mellon University Melzer, L. S. (2012) Factors Involved in Adding Carbon Capture, Utilization and Storage (CCUS) to Enhanced Oil Recovery, CO2 Flooding Conference February 2012, National Enhanced Oil Recovery Initiative.

RITA (2012) Average Freight Revenue per Ton-mile (current ¢), National Transportation Statistics, Research and Innovation Technology Administration, Table 3-21, Bureau Transport Statistics, April.

Salmon, R., & Logan, A. (2013) Flaring Up: North Dakota Natural Gas Flaring More than Doubles in Two Years. CERES, July 2013.

SEC (2009) Securities and Exchange Commission, Federal Register/Vol. 74, No. 9/Wednesday, Jan. 14, 2009/Rules and Regulations page 2192; Undeveloped Oil and Gas Reserves [4-10(a)(31)]; Guidance (Question 131.03 in 26 Oct. 2009 CD&I)

SPE et al. (2011) Guidelines for Application of the Petroleum Resources Management System, Society Petroleum Engineers Stell, M. (2011) An Auditor's View of Booking Reserves in CO2 EOR Projects and the ROZ, Permian Basin Study Group Residual Oil Zone Symposium, April 4, Ryder Scott Co.

Trentham, R. (2012) Developing a Case History in the Permian Basin of New Mexico and West Texas (08123-19) June 23 for Research Partnership to Secure Energy for America.

Wallace, M.; Kuuskraa, V.; & DiPietro, P. (2014) Near-Term Projections of CO2 Utilization for Enhanced Oil Recovery, April 7, US Department of Energy, DOE/NETL-2014/1648.

Zeman, F. & Lackner, K. (2008) The Reduced Emission Oxygen Kiln, July 31, The Earth Institute, Columbia University, New York, Report 2008.01

SUMMARY OF THE INVENTION

In some embodiments of the present invention, a CO2 calciner system may be operable to combust fuel, exchange heat by one of indirect recuperative and regenerative heating between a hot combustion fluid and a sideflow calciner fluid to calcine crushed carbonate in a calciner, discharge alkaline oxide comprising an alkali metal and/or an alkaline-earth metal, and deliver a pressurized enhancing fluid comprising CO2 formed thereby, such as for enhancing oil or hydrocarbon recovery.

In some embodiments, a sideflow calciner fluid may be withdrawn from a sideflow outtake manifold in the calciner and be heated with a heated combustion gas from a combustor using an indirect heat exchanger such as a regenerative or recuperative heat exchanger. The heated sideflow calciner fluid may then be reinjected into an intake manifold in the calciner to calcine crushed carbonate to carbon dioxide and alkaline oxide. The calciner fluid may preheat the crushed carbonate while being cooled in carbonate counter flow. A recirculating calciner fluid may be extracted out of an upper recirculating calciner fluid outlet manifold and be reinjected into a lower recirculating calciner fluid inlet manifold. Fluid pressurizers may be used to repressurize and circulate the sideflow calciner fluid and the recirculating calciner fluid.

The calciner comprising a pressure vessel and a refractory insulating lining may have an upper carbonate feeder operable to feed crushed alkaline carbonate into the calciner and a recirculating calciner fluid outlet manifold to withdraw recirculating calciner outlet fluid near the carbonate feeder. The mid portion of the calciner may comprise a sideflow fluid intake manifold to receive heated sideflow calciner fluid above a sideflow fluid outtake manifold to deliver sideflow calciner fluid to be heated. e.g., the calciner mid portion may comprise about 70% of the internal calciner volume in some configurations. A lower recirculating fluid inlet manifold to recycle or recirculate outlet calciner fluid from the upper recirculating fluid outlet manifold may be located in the lower portion of the calciner near a discharger operable to discharge alkaline oxide from the calciner.

The calciner system may comprise a sideflow pressurizer operable to repressurize sideflow calciner fluid, in fluid communication with the sideflow fluid outtake manifold and the sideflow fluid intake manifold. A recirculating pressurizer operable to repressurize and recirculate outlet calciner fluid may be located in fluid communication with the recirculating fluid outlet manifold and the recirculating fluid inlet manifold. A delivery pressurizer may be configured to take a portion of enhancing fluid comprising CO2 from the upper fluid outlet manifold, and to pressurize and deliver it for use, such as for enhancing oil recovery or hydrocarbon recovery.

The calciner system may further comprise an oxidant delivery system having an oxidant pressurizer operable to deliver pressurized oxidant fluid comprising an oxidant, and a fuel delivery system having a fuel pressurizer operable to deliver pressurized fuel fluid comprising a fuel. These fuel and oxidant delivery systems may deliver oxidant fluid and fuel fluid to a combustor operable to receive, mix, and combust fuel fluid and oxidant fluid, thereby forming a hot combustion fluid. A refractory heat exchanger of a refractory ceramic or metal and operable to exchange heat between the hot combustion fluid and the sideflow calciner fluid, may be configured in serial fluid communication with the sideflow fluid outtake manifold, the sideflow pressurizer, and the sideflow fluid intake manifold.

A plurality of process fluid monitors, operable to monitor a multiplicity of combustor, refractory heat exchanger, and calciner fluids, may be connected to a controller operable to monitor and control the multiplicity of process fluids. The controller may be configured to control a plurality of fluid pressurizers comprising fuel and oxidant pressurizers, calciner fluid sideflow, recirculating and delivery pressurizers, and one of the upper carbonate feeder and the lower alkaline oxide discharger.

A CO2 delivery method may comprise delivering crushed carbonate into the calciner by the carbonate feeder, combusting oxidant fluid with fuel fluid in the combustor to form the combustion fluid; extracting the calciner fluid from the calciner through the sideflow outtake manifold; indirectly heating the calciner fluid with the combustion fluid by one of regenerating and recuperating heat using the refractory heat exchanger; and delivering the heated calciner fluid back into the calciner though the sideflow intake manifold above the sideflow outtake manifold. The method may further comprise flowing heated calciner fluid up through crushed carbonate, thereby calcining the carbonate, generating alkaline oxide, discharging the alkaline oxide through the alkaline oxide discharger, and extracting an enhancing fluid comprising CO2 from the upper fluid outlet manifold.

The CO2 delivery method may further comprise repressurizing and recirculating the first portion of the extracted fluid into generated alkaline oxide through the recirculating inlet manifold, and pressurizing and delivering enhancing fluid comprising a second portion of the extracted fluid. The method may comprise controlling the combustion fluid temperature and combustion fluid flow rate through the refractory heat exchanger; controlling the calcining fluid flow rate through the crushed carbonate and the calcining fluid sideflow flow rate; controlling the CO2 delivery rate to within a prescribed CO2 delivery range not exceeding an emergency CO2 generation capacity; and controlling the carbonate delivery rate to not greater than a prescribed calcining rate corresponding to the CO2 delivery rate.

The CO2 delivery method may comprise controlling one or more of the pressure, temperature, and flow rate of the combustion fluid, one or more of the recirculating calciner fluid inlet pressure and flow rate, sideflow calciner fluid pressure flow rate and temperature, one of the crushed carbonate delivery rate, alkaline oxide discharge rate, and the CO2 enhancing fluid delivery rate.

The CO2 delivery method may comprise delivering combustion fluid to the refractory heat exchanger sufficient to form heated calcining fluid and calcine carbonate at a rate sufficient to deliver the enhancing fluid comprising extracted CO2 fluid within a prescribed CO2 fluid delivery range. With regenerative refractory heat exchangers, the CO2 delivery method may further comprise controlling the mean differential pressure between the combustion side pressure and the sideflow side pressure to less than a prescribed differential pressure.

BRIEF DESCRIPTION OF THE DRAWINGS

These and other features and advantages of the present invention will become apparent from the following description of the invention which refers to the accompanying drawings, wherein like reference numerals refer to like structures across the several views, and wherein:

FIG. 3 schematically illustrates flows within the calciner of heating fluid and heat recovery fluids relative to descending flows of crushed carbonate and alkaline oxide.

FIG. 4 schematically illustrates flows within the calciner of heating fluid and heat recovery fluids.

DETAILED DESCRIPTION OF EMBODIMENTS FOR THE INVENTION

Figure 1:
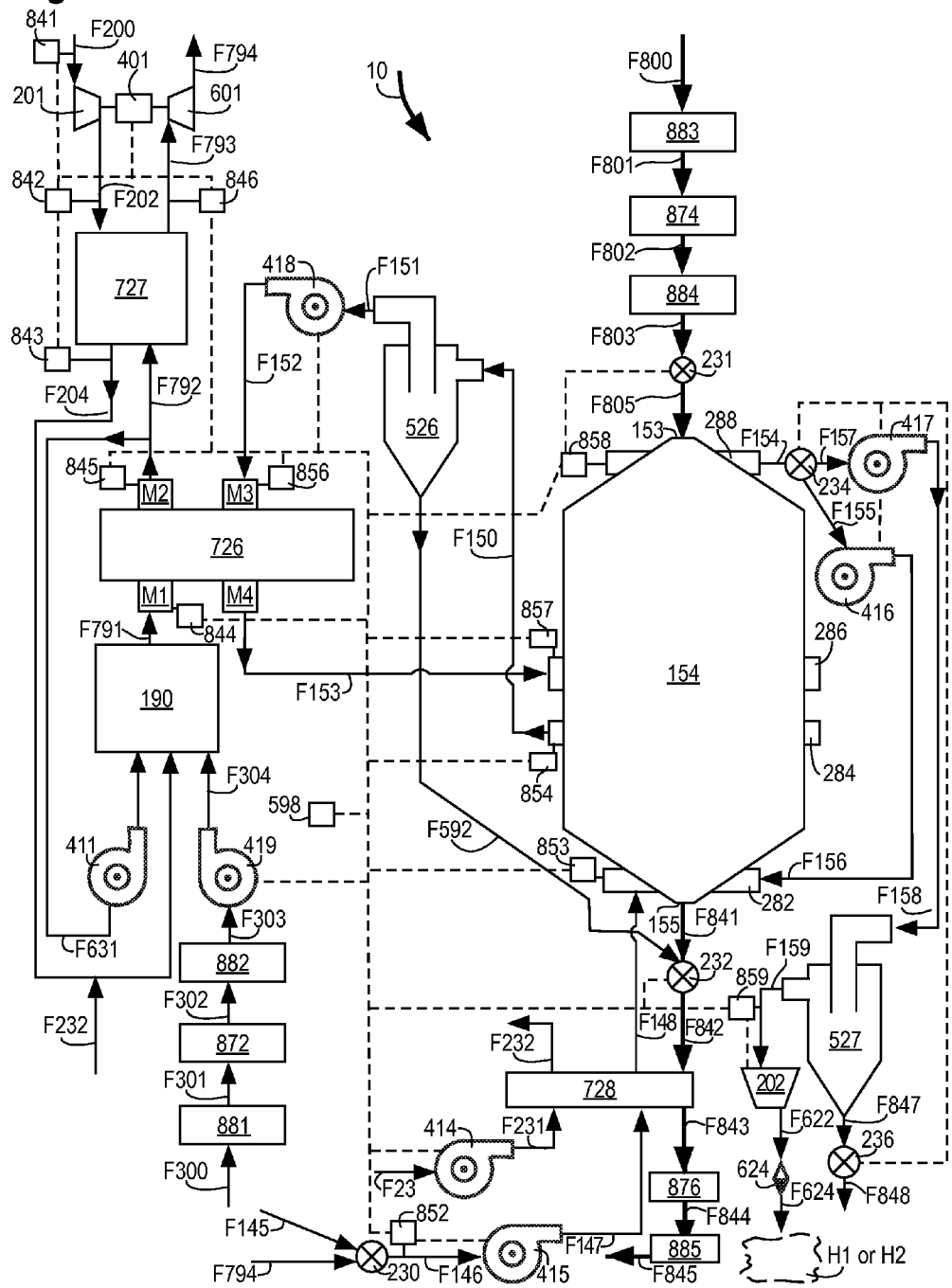
FIG. 1 schematically illustrates a calciner system operable to indirectly heat and calcine an alkaline carbonate to form and capture CO2 and form an alkaline oxide.

As schematically illustrated in FIG. 1, some embodiments of the invention relate to a CO2 capturing calciner system 10 operable to combust a fuel fluid F300 comprising a fuel with an oxidant fluid F200 comprising an oxidant in a combustor 190, to heat a heat transfer or sideflow calciner fluid F150 via an indirect high temperature or refractory heat exchanger 726 for delivery to the calciner 154 to calcine a crushed alkaline carbonate flow F800 and to capture or form a pressurized enhancing fluid F622 comprising CO2 to deliver and inject into a hydrocarbon resource H1 or H2 through one or more enhancing injection wells 624 as enhancing fluid F624 via a delivery compressor or pressurizer 202, whereby forming an alkaline oxide F844.

Particulate separator: Extracted sideflow calciner fluid F150 may be cleaned with a fluid cleaner or particulate separator 526 to remove a portion of entrained particulates and form a cleaned calciner fluid F151. The particulate separator 526 may comprise one or more of a cyclonic filter and an electrostatic precipitator. For example, the cyclonic filter may use an array of small cyclones such having a diameter of about 13 mm, 25 mm, or 38 mm (0.5", 1", 1.5") in diameter. The filtered particulates may be delivered as fluid F592 to the pressurized discharge 232. e.g., to pressurized discharge 232 near the outlet 155 of calciner 154. In other configurations, sideflow calciner fluid F150 may be extracted and delivered to the refractory heat exchanger 726 without such particulate separation.

Repressurizer: In some embodiments, a pressure booster or trim repressurizer or sideflow pressurizer 418 such as a blower or turbo fan, may be used to boost the pressure of or repressurize one of heat transfer or sideflow calciner fluid F150 and cleaned calciner fluid F151 to form a pressurized calciner fluid F152. e.g., to restore the pressure drop through the particulate separator 526, and accommodate a heating pressure drop through the refractory heat exchanger 726, and associated pressure drops through the preheated calciner fluid extraction and outtake manifold 284, ducting to particulate separator 526, to refractory heat exchanger 726 and back to and redelivery through a calciner insertion or intake manifold 286. In other configurations, sideflow repressurizer 418 may be configured between refractory heat exchanger 726 and intake manifold 286 or particulate separator 526.

To accommodate the elevated operating temperature of sideflow calciner fluid F150 or heated calciner fluid F153, in some configurations sideflow repressurizer 418 may use technology from gas turbine expanders to accommodate gas temperatures ranging from 875 degrees C. to 1525 degrees C. e.g., sideflow repressurizer 418 may use a section of a gas turbine expander driven to form a high temperature or refractory pressurizing turbo fan. Sideflow repressurizer 418 may use fit for purpose turbine blades to form a blower etc. depending on the pressure ratio required. e.g., by using one or more of thermal insulation coatings, internal fluid or evaporative cooling, and delivery of cooling gas flow over the blade exterior.

High temperature heat exchanger: As depicted in FIG. 1, in some embodiments, calciner 154 may be configured to withdraw the sideflow calciner fluid F150 to be indirectly heated in a high temperature or refractory heat exchanger 726 to deliver the heated calcining fluid F153 back to the calciner 154 to calcine the feed crushed alkaline carbonate flow F800 to form and discharge an alkaline oxide F844 and an enhancing fluid F622 comprising CO2 for delivery to enhancing injection wells 624.

Refractory heat exchanger 726 may be used to transfer heat from a hot combustion gas F791 produced by the combustor 190 to pressurized calciner fluid F152 to form the heated calciner fluid F153. The preheated sideflow calciner fluid F150 may be extracted from calciner 154 via the calciner fluid extraction or outtake manifold 284 in fluid communication with fluids passing through the calciner 154. Hot combustion gas F791 may be delivered through manifold M1 into refractory heat exchanger 726 and the cooled combustion fluid F792 may be withdrawn via manifold M2 for delivery to preheater 727.

After cleaning sideflow calciner fluid F150 through particulate cleaner 526, and pressuring cleaned calciner fluid F151 through pressurizer 415, pressurized calciner fluid F152 may be delivered through manifold M3 into refractory heat exchanger 726 and heated fluid F153 withdrawn from refractory heat exchanger 726 via manifold M4 for delivery as heated calciner fluid F153 for delivery into calciner intake manifold 286.

Regenerative heat exchangers: In some embodiments, the refractory heat exchanger 726 may comprise a regenerative "heat wheel" heat exchanger with manifolds M1 and M4 on one side and manifolds M2 and M3 on the other side for fluid delivery and withdrawal. Regenerative packed beds of refractory metal or ceramic articles may be used for refractory heat exchanger 726. Other regenerative heat exchangers may similarly be used for refractory heat exchanger 726 in other configurations.

Recuperative heat exchangers: In some configurations, the refractory heat exchanger 726 may comprise high temperature refractory metal or ceramic heat transfer walls to separate combustion fluid from calciner fluid. Such recuperative heat exchangers may be able to support higher pressure differentials between inlet and outlet than a heat wheel, depending on the fluid duct connections used.

Heat exchanger materials: In some configurations, the refractory heat exchanger 726 may be configured to be operable within the range from 900 degrees C. to 1300 degrees C. In other configurations, refractory heat exchanger may be operable over a portion of the range from 1300 degrees C. to 2000 degrees C. for higher temperature calcining Such heat exchangers may comprise a refractory ceramic such as is known in the relevant art. e.g., they may comprise one or more of alumina, alumina silicate, cordierite, quartz, mullite, magnesium silicate, sapphire, zirconia, or partially stabilized zirconia. In some configurations, the heat exchanger may or a refractory metal such as a nickel based alloy such as is used in the relevant art.

Heat exchanger configuration: In some configurations the refractory heat exchanger 726 may comprise a refractory tubular heat exchanger configured to transfer high temperature heat from the hot combustion gas F791 to the sideflow calciner fluid F150. e.g., the heat transfer tubes may be formed from one of a refractory ceramic and/or a refractory metal as described above. In other configurations, the refractory heat exchanger may comprise a high temperature plate heat exchanger formed from a similar refractory ceramic or refractory metal.

Regenerative heat exchanger: In some configurations the refractory heat exchanger 726 may comprise a regenerative heat exchanger. e.g., refractory heat exchanger 726 may comprise a heat wheel through which a hot gas may be passed to heat a portion of the heat wheel as it rotates. Then the calciner heating fluid may be passed through the heated portion of the heat wheel to recover the high temperature heat. Similarly, the regenerative heat exchanger may comprise one or more porous regenerative beds comprising a bedding or packing operable to flow a fluid through it. e.g., such regenerative beds may comprise refractory ceramic or metal beads, spheres, tubes, fibers, or extruded monoliths.

Combustor: In some embodiments, the fuel fluid F300 comprising a fuel may be combusted with oxidant fluid F200 comprising an oxidant to form hot combustion gas F791 to deliver thermal energy to refractory heat exchanger 726. The hot combustion gas F791 may be cooled by refractory heat exchanger 726 to form a flue gas F792 while recovering heat to pressurized calciner fluid F152 to form heated calciner fluid F153.

Oxidant fluid: The oxidant fluid F200 comprising an oxidant may be suitably pressurized by pressurizer 201 driven by a prime mover 401 to form a pressurized oxidant fluid F202. The flue gas F792 from refractory heat exchanger 726 may be used to preheat the pressurized oxidant fluid F202 in a preheater heat exchanger or preheater 727 to form a preheated oxidant fluid F204 and a cooled flue gas F793. The cooled flue gas F793 may be expanded through expander 601 to form expanded exhaust fluid F794 and recover a portion of the pressurizing work by pressurizer 201 on the intake oxidant fluid F200. Such expansion may be used to recovery power to assist the prime mover 401 to compress the incoming oxidant fluid F200.

Oxy-fuel combustion: In some embodiments, an oxidant fluid F200 comprising oxygen or oxygen enriched air may be used to combust fuel F300 to form a high CO2 combustion gas with reduced or low nitrogen content. This very high or high CO2 combustion gas may be delivered into the calciner 154 via intake manifold 286 at an intermediate region between the upper alkaline carbonate inlet 153 or feeder 231 and the lower alkaline oxide outlet 155 or alkaline oxide discharger 232.

Diluted combustion: Combustor 190 may be used to combust processed fuel F303 with oxidant fluid comprising the oxidant fluid F200 diluted by diluent F631. Diluent F631 may comprise a recirculated portion of the flue gas F792, repressurized by diluent pressurizer 411. In other configurations, thermal diluent F631 may comprise a portion of the cooled flue gas F793, or a portion of an expanded exhaust fluid F794.

Calciner: Referring further to FIG. 1, with further detail in FIG. 2, FIG. 3, and FIG. 4, calciner 154 may comprise a pressure vessel 157 lined with refractory insulation 156 with an upper inlet 153 for crushed carbonate F805 connected to or in a top portion 298 of the calciner. A recirculating fluid outlet manifold 288 may be positioned below the top portion 298 and an upper calciner portion 296 of calciner 154, and connected to an outlet duct 289 for calciner outlet fluid F154. An intake manifold 286 may be positioned below the upper calciner portion 296 and above a lower calciner portion 294, and be connected to an intake duct 287 for heated calciner fluid F153. An outtake manifold 284 may be positioned below the intake manifold 286 and above a lower calciner portion 294, and be connected to a calciner outtake duct 285 for calciner outtake fluid F150. A calciner fluid inlet manifold 282 connected to calciner inlet duct 283 for calciner inlet fluid F156 may be provided below calciner lower portion 294 and above a calciner bottom 292 having an outlet 155 for calcined crushed carbonate or outlet alkaline oxide flow F841.

Porous or open calciner walls: In some configurations, a porous ceramic or metal refractory wall 158 may be provided to prevent crushed carbonate F805 and/or alkaline oxide F841 from flowing out into one or more manifolds such as 282, 284 or 286 as shown and optionally manifold 288. In some configurations, the calciner may be configured to allow for an open portion with a natural angle of repose of the descending crushed carbonate F805 or alkaline oxide, such as shown in the calciner portion corresponding to the upper fluid outlet manifold 288 in FIG. 2, and to an intake duct 286 below calciner upper portion 296, and outtake duct 284 above lower calciner portion 294 in FIG. 3 and FIG. 4.

Calciner fluid flow: Referring to FIG. 1, with detail in FIG. 2 through FIG. 4, the pressurized calciner fluid F152 that is heated by refractory heat exchanger 726 to form the heated calciner fluid F153 may be delivered into the calciner delivery or intake manifold 286 into the kiln or calciner 154. e.g., the calciner intake manifold 286 may be an insulated circumferential or toroidal passage surrounding and in fluid communication with a vertical cylindrical section of the calciner 154. Thus delivering heated calciner fluid F153 into the calciner indirectly transfers thermal energy from hot combustion gas F191 from the combustor 190 to heat crushed alkaline carbonate F805 in the calciner 154.

Indirect calciner: FIG. 1 schematically illustrates a calcining EOR embodiment of calciner 154 comprising the refractory heat exchanger 726 used to heat the pressurized calciner fluid F152 comprising one of CO2 and fluid water (herein "H2O") with the heat generator 190 to form the heated calciner fluid F153. e.g., heat generator 190 may be a natural gas burner, a VAST Thermogenerator for gaseous or liquid fuel, and/or a circulating fluidized bed combustor for gaseous, liquid or solid fuel, Combustor 190 may comprise a gasifier to gasify a solid fuel such as solid or viscous hydrocarbon comprising coal, lignite, petroleum coke, bitumen, kerogen, heavy oil or biomass.

Heated calciner fluid F153 may heat and calcine the alkaline carbonate flow F800 in the calciner 154, generating the enhancing fluid F622 and the alkaline oxide F842. e.g., in some configurations, the crushed carbonate flow F800, such as limestone and/or dolamite, may heated and calcined in the calciner 154 with the heated calciner fluid F153 heated in the refractory heat exchanger 726, to generate an enhancing fluid F622 comprising CO2.

Carbonate feeder and alkaline oxide discharger: In some configurations, carbonate flow F800 may be fed into an carbonate inlet 153 of the calciner 154 through a pressurized feeder 231 as pressurized carbonate F805, such as through a gravity fed tube, a screw feed, drag conveyor and/or lock hopper according to the design calciner differential pressure. The resultant calcined alkaline oxide flow F841 may be discharged through an oxidant outlet 155 of calciner 154 through a pressurized extractor, expeller or discharger 232 such as a screw extractor, drag conveyor or lock hopper as a depressurized alkaline oxide flow F842. The carbonate inlet 153 may be effectively part of feeder 231, and the alkaline outlet 155 may be described as effectively part of the depressurizing alkaline expeller or discharger 232.

Buffer store and pulverizer: In further configurations, per FIG. 1, carbonate flow F800 may be stored in a buffer carbonate store 883. e.g., carbonate store 883 may comprise two, three, or four times possible supply disruptions. e.g., two weeks to four weeks supply of carbonate may be used to buffer bulk delivery via rail, road, or waterway. With a surface miner capable rapid extraction, larger carbonate stores 883 may be used such as 2 months, 4 months or 8 months supply, to benefit from lower extraction costs and reduce miner relocation costs. Extracted carbonate F801 may be taken from carbonate store 883 and further crushed or pulverized in crusher or pulverizer 874 to form crushed or pulverized carbonate F802 for storage in buffer crushed carbonate store 884.

Heat recovery, grinding, storage: The depressurized alkaline oxide F842 may be passed through a recovery heat exchanger 728 to form cooled alkaline oxide F843 that may be stored in one or more alkaline oxide buffer stores 885 such as storage containers, bins or silos, to buffer oxide production flows. Where fluid F592 comprises CO2, heat exchanger 728 preferably cools alkaline oxide 841 down through and below the carbonation temperature regime. Alkaline oxide F843 may then be further crushed, pulverized, ground or comminuted in alkaline oxide crusher, pulverizer or grinder 876 to form ground alkaline oxide F844 per market requirements. Ground alkaline oxide F844 may be stored in alkaline oxide store 885 and be delivered as batched alkaline oxide F845 to periodic transport facilities. e.g., as ground lime or dololime delivered to unit trains, or trucks, or barges.

Hot calcining fluid delivery: Further to FIG. 1, in some configurations, the carbonate flow F800, such as limestone and/or dolomite, may be calcined by delivering the heated calcining fluid F153 into intake manifold 286 located in the middle portion of the calciner 154 between calciner inlet 153 below pressurized feeder 231 and calciner outlet 155 above the pressurized discharger 232. e.g., through a toroidal intake manifold 286 surrounding the central heating zone of the calciner and in fluid communication with the central calciner flows. e.g., the calciner's middle portion may be between 40% to 80%, or between 60% and 70% of the calciner 154.

The heated calciner fluid F153 may heat and calcine the carbonate in the mid kiln portion. Then the rising heated calciner fluid F153 and generated CO2 may preheat descending carbonate F805. A cooled or calciner outlet fluid F154 comprising the heated calciner fluid F153 and the CO2 generated by calcining carbonate, may be discharged or released out through an upper fluid outlet manifold 288 near the top inlet 153 or carbonate feeder 231 of the calciner 154. A first portion of cooled or outlet calciner fluid F154 may be pressurized through a calciner recycling blower or repressurizer 416 to form a cooled pressurized calciner inlet fluid F156.

Recycling or cleaning calciner fluid: Further to FIG. 1, with detail in FIG. 2, FIG. 3 and FIG. 4, a first portion F155 of cooled outlet calciner fluid F154 may be directed via a multiway fluid valve 234 to be repressurized by recirculating repressurizer 416 and to be returned as a heat recovery calciner inlet fluid F156 through a bottom inlet manifold 282 near the lower calciner outlet 153 of calciner 154 or alkaline oxide discharger 232. e.g. to recover heat from descending alkaline oxide within a lower portion of calciner 154 below outtake manifold 284. A second portion F157 of cooled or outlet calciner fluid F154 comprising CO2 may be pressurized by a delivery pressurizer 417 and delivered as pressurized enhancing fluid F158 to a particulate cleaner 527 to be cleaned of particulates and form cleaned enhancing fluid F159.

Enhancing fluid delivery: Cleaned enhancing fluid F159 may be pressurized by delivery compressor or pressurizer 202 to form pressurized enhancing fluid F159 comprising CO2. Enhancing fluid F159 may be delivered to the enhancing injection wells 624 into a hydrocarbon resource. e.g., one of hydrocarbon resources H1 or H2. Alkaline oxide particulates may be recovered from particulate cleaner 527 as pressurized alkaline oxide flow F847 which may then be discharged through alkaline oxide depressurizer or discharger 233 as particulate alkaline oxide flow F848 for delivery to a useful application such as cement manufacture or lime, or for disposal.

Rising calciner inlet recovery flow F156 may recover heat against descending alkaline oxide F841. Such preheated calciner fluid may then be discharged through the extraction or outtake manifold 284 (located below intake manifold 286) as sideflow calciner fluid F150. e.g. extraction or outtake manifold 284 may be donut shaped or toroidal manifold to surround calciner 154.

Figure 2:
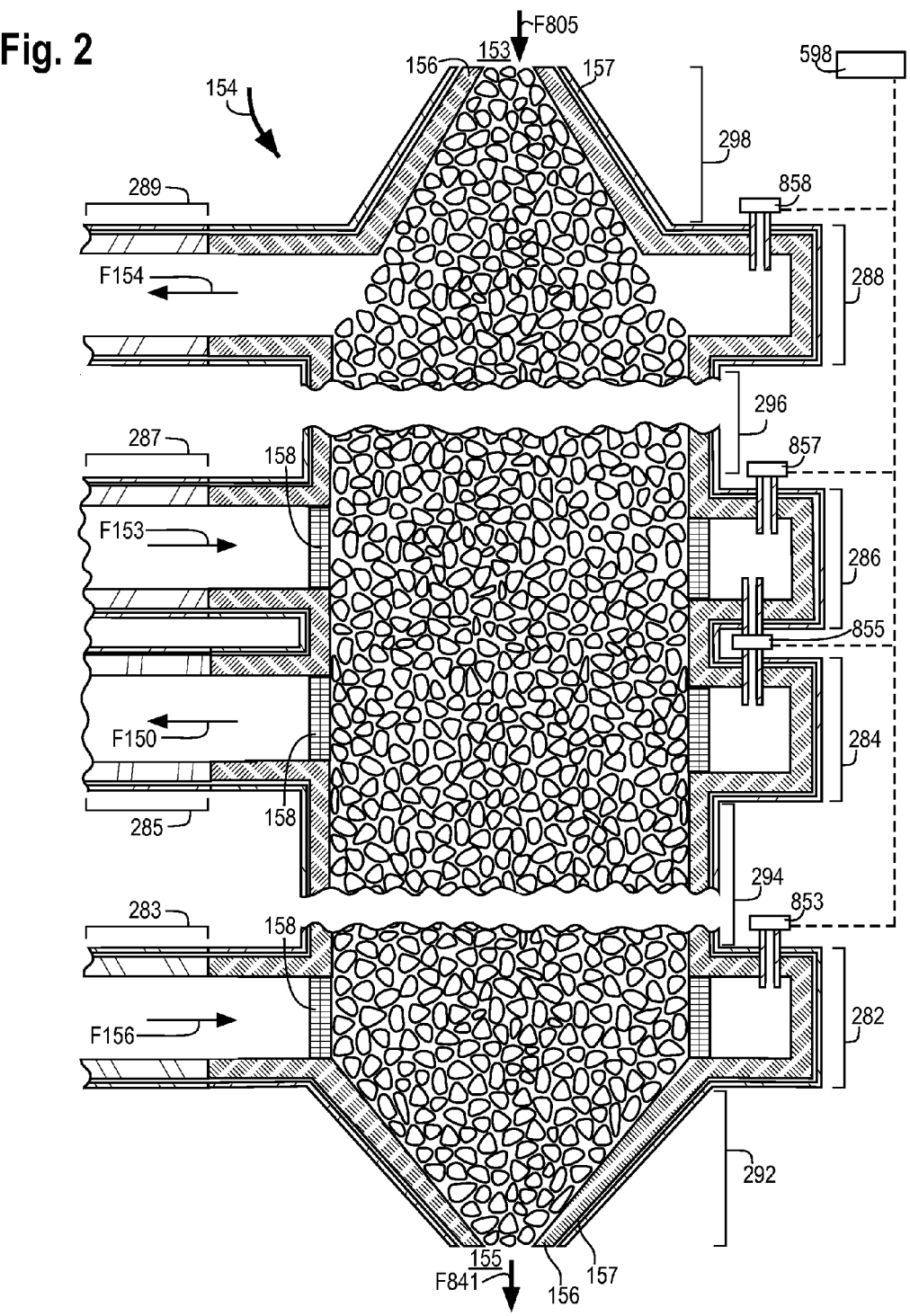
FIG. 2 schematically illustrates overall heating and heat recovery flows within the calciner with descending flows of crushed carbonate and alkaline oxide.

Process monitors: In some embodiments, as depicted in FIG. 1, FIG. 2, and FIG. 3, a plurality of process monitors may be configured to monitor process parameters comprising one or more of pressure, temperature, flow and composition, for use by a controller 598. e.g., an outflow manifold process monitor 854 may comprise an absolute pressure transducer operable to measure pressure in outtake manifold 284, and an intake manifold process monitor 857 may comprise an absolute pressure transducer operable to monitor one or more of the pressures in the intake manifold 286. One or more of these process monitors may utilize multiple pressure temperature flow or composition transducers to improve reliability and/or reduce uncertainty.

In other configurations, as depicted in FIG. 2 and FIG. 4, One of the outtake manifold 284 and the intake manifold 286 may comprise absolute pressure transducers as outtake monitor 854 and intake monitor 857. A related differential process monitor 856 may comprise a differential pressure transducer operable to measure a differential pressure between the outtake manifold 284 and the intake manifold 286.

As further depicted in FIG. 1, in some configurations, a calciner fluid heat exchange inlet process monitor 856 may be operable to monitor a pressure of pressurized calciner fluid F152 between sideflow repressurizer 418 and refractory heat exchanger 726. A calciner outlet process monitor 858 may be operable to monitor one of the pressure in outlet manifold 288, the outlet calciner fluid F154 pressure between outlet manifold 288 and enhancing fluid delivery pressurizer 417, and the outlet flow F155 pressure between outlet manifold 288 and recirculating repressurizer 416. A process monitor 859 may be configured to monitor the pressure of one of fluid F159 out of particle separator 527 or fluid F158 into particle separator 527.

In some configurations, an ambient process monitor 841 may comprise pressure transducer operable to monitor atmospheric pressure such as the oxidant fluid flow F200 near the intake to pressurizer 201, or of flow F23 inlet to blower 419, or equivalently to monitor. A pressurized oxidant process monitor 842 may monitor pressurized flow F202 out of pressurizer 201. A preheated oxidant process monitor 843 may monitor one or more of a pressure and a temperature of preheated oxidant fluid F204 between preheater 727 and combustor 190.

Similarly, one or more process monitors 844, 845 and 846 may be configured to monitor one or more of pressure, temperature, and composition of hot combustion gas F791 between combustor 190 and refractory heat exchanger 726, cooled combustion fluid F792 between refractory heat exchanger 726 and preheater 727, and cooled flue gas F793 between preheater 727 and expander 601 respectively. Process monitor 852 may monitor calciner pressurizer flow F146 into calciner pressurizer 415 that forms pressurized fluid F147.

Controller: Referring to schematic FIG. 1 and FIG. 2, in some embodiments, a controller 598 may be used to control gaseous flows through the calciner system 10, including the refractory heat exchanger 726 and the calciner 154. One or more temperature transducers, mass flow transducers, and/or composition sensors may be configured with process monitors 841, 842, 843, 844, 845, 846, 852, 853, 854, 856, 857, 858 in communication with controller 598. A portion of pressurized intake air F202 may be used to cool one or more of pressure transducers 853, 854, 855, 856, 857 and 858 and/or associated sensor ducts (not shown). Controller 598 may be in communication with one or more pressurizers 201, 202, 411, 414, 415, 416, 417, 418 and 419, feeder 231, dischargers 232 and 236, pump 402, prime mover 401, expander 601, and valves 230, 234, and combustor 190.

The controller 598 may be configured to control the absolute and/or gauge pressure in one or both of calciner outtake manifold 284 and intake manifold 286, and/or control the differential pressure between outtake manifold 284 and intake manifold 286. e.g., to control flows and pressures, the controller 598 may monitor an outflow manifold pressure transducer 854 and a intake manifold pressure transducer 857 to monitor one or both of the absolute pressures in the outtake manifold 284 and intake manifold 286. As schematically shown in FIG. 1 and FIG. 2 in other configurations, controller 598 may monitor one or more of pressure transducers 854, 856 and 857 configured to measure absolute pressure in one of the outtake manifold 284, heat exchange intake manifold M3, and in intake manifold 286, and the differential pressure 855 between outtake manifold 284 and intake manifold 286.

Referring to schematic FIG. 1 and FIG. 2, in some configurations, the controller 598 may be used to monitor calciner outflow and inflow pressures in outtake manifold 284 and intake manifold 286, as measured by pressure transducers in outtake process monitor 854 and intake process monitor 857. In similar configurations, the controller 598 may monitor an equivalent combination of an absolute pressure in one of process monitors 854 and/or 857 together with a differential pressure in process monitor 855.

Controller and process monitors: In some configurations, controller 598 may monitor one or more process monitors monitoring monitor flows about combustor 190, refractory heat exchanger 726 and preheater 727. e.g., controller 598 may monitor one or more of: the inlet oxidant process monitor 841 monitoring one of intake oxidant fluid or air comprising F23, F200, and F232; a pressurized oxidant monitor 842 monitoring pressurized oxidant flow F202 between pressurizer 201 and pressurized oxidant preheater 727; a process monitor 843 monitoring preheated oxidant fluid F204 between preheater 727 and combustor 190; a process monitor 844 monitoring hot combustion gas F791 between combustor 190 and refractory heat exchanger 726;

a process monitor 846 monitoring cooled flue gas F793 between preheater 727 and expander 601.

Figure 5:
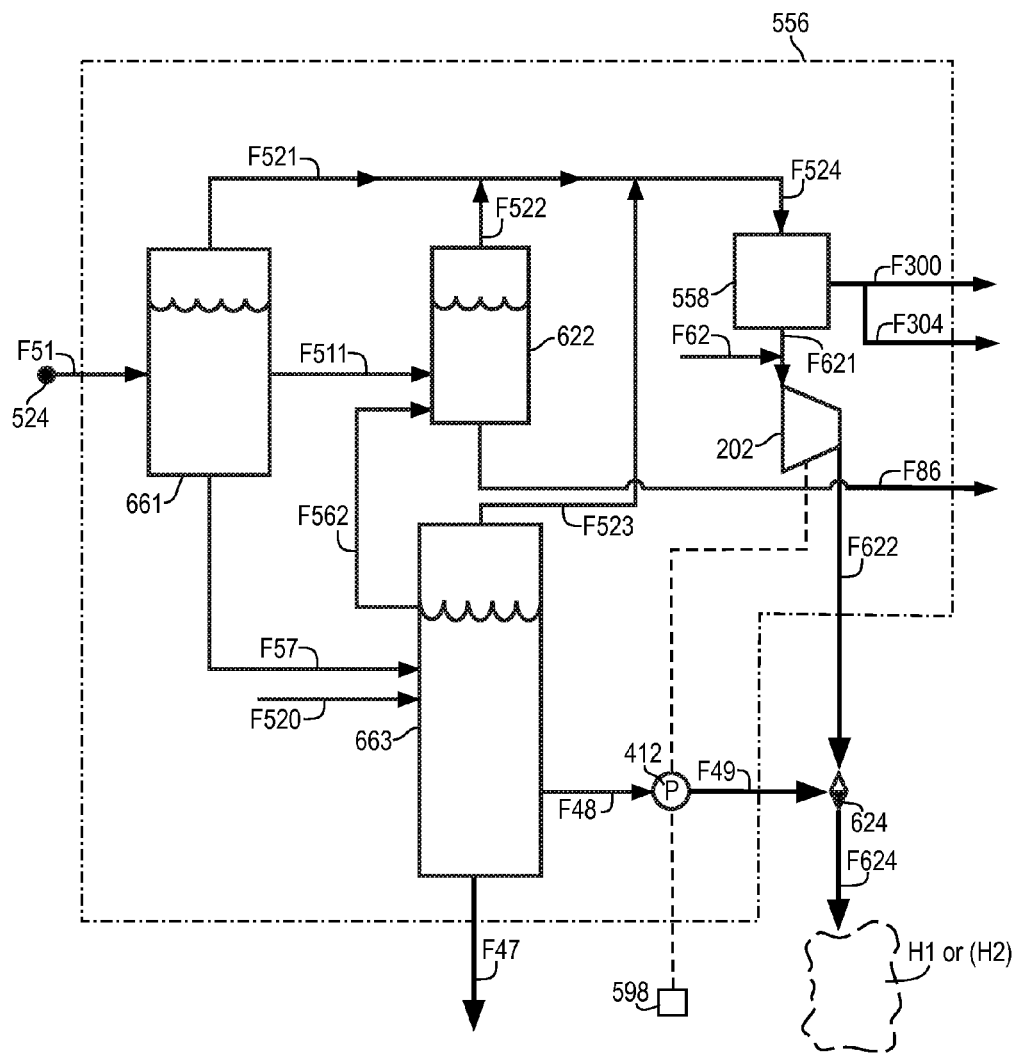
FIG. 5 schematically illustrates a processing battery to process produced fluid to separate hydrocarbon fluids and aqueous fluid to recirculate enhancing fluid.

Separation & recycling: With reference to FIG. 5, in some embodiments the produced fluid F51 comprising a hydrocarbon and one of $CO_2$ and water may be produced from one or more producer wells 524 and processed through the separation battery 556. Separation battery 556 may separate the produced fluid F51 into a hydrocarbon fluid F86, an enhancing fluid F622 comprising $CO_2$ and an aqueous injection fluid F49. In some configurations, the produced fluid F51 may be separated in a primary separator 661 into a light gaseous stream F521 comprising $CO_2$, an intermediate density hydrocarbon stream F511 comprising a hydrocarbon, and a denser aqueous stream F57 comprising water.

The intermediate hydrocarbon fraction F511 from primary separator 661 may be stored in hydrocarbon storage tank 622. The gaseous stream F521 may be compressed by a delivery pressurizer or compressor 202 and delivered as enhancing fluid F622 back to the hydrocarbon resource. Aqueous fluid F57 from the bottom of primary separator 661 may be stored in an aqueous storage tank 663. Aqueous fluid F48 may be drawn from near the bottom of the aqueous storage tank 663 and be pressurized by pressurizer or pump 412 to inject aqueous enhancing fluid F49 back into the hydrocarbon reservoir or resource via one or more enhancing injection wells 624. e.g., as a prescribed 'water flood' interspersing enhancing fluid floods, such as "water alternating gas" (WAG). The controller 598 may control pump 412 and pressurizer 202 as described herein.

Per FIG. 5, in some configurations, the primary separated fluid streams may be further processed by secondary separation in the separation battery 556. e.g., the aqueous stream F57 may be further processed using a skimmer in aqueous storage tank 663 to skim off a residual hydrocarbon stream F562 and deliver it to the hydrocarbon storage tank 622. Hydrocarbon fluid F86 may then be transported from hydrocarbon storage tank 622 to market. e.g., as crude oil or heavy oil etc. A gaseous fluid F522 comprising one of $CO_2$ and a gaseous hydrocarbon may be stripped from the hydrocarbon fluid F511 in storage tank 622 and combined with the recovered gaseous stream F521. This combined gaseous fluid may then be compressed by the delivery pressurizer or compressor 202 and the resultant enhancing fluid F622 reinjected into the enhancing injection wells 624.

In some embodiments, the separation battery 556 may be configured with a $CO_2$ separation system 558 to recover fluid $CO_2$ F621 from the gaseous fluid stream F524 and deliver a gaseous hydrocarbon F300 comprising a gaseous hydrocarbon from the separation battery 556. A portion F304 of gaseous hydrocarbon fluid F300 may be separated and delivered to the combustor 190 shown in FIG. 1. New or makeup enhancing fluid F62 comprising $CO_2$ may be added to recovered enhancing fluid F621 comprising $CO_2$, to be compressed by the delivery compressor 202 in delivering enhancing fluid F622 to enhancing injection wells 624, to be delivered as injected enhancing fluid F624 into one of hydrocarbon resource H1 or H2. A residual fluid comprising solids F47 may be withdrawn from the aqueous storage tank 663 and suitably disposed of.

Recovering alkaline oxide heat: Referring to FIG. 1, a recovery heat exchanger 728 may be configured between the outlet 155 of calciner 154 and depressurizing expeller, expelling lock hopper or discharger 232, or below the discharger 232. Residual heat from discharged alkaline oxide or lime F841 discharged from discharger 232 may be recovered via recovery heat exchanger 728 to form cooled alkaline oxide or lime F843. In some configurations, heat may be recovered from alkaline oxide flows F841 or F842, to pressurizing fluid F147 via a recuperating or regenerating heat exchanger 728 into heated pressurized inlet fluid F148 into recycling fluid inlet duct 282, to recirculating heat into calciner 154.

Heat recovery for combustion: Intake oxidant fluid or air F23 may be pressurized with oxidant pressurizer 414 such as a blower or fan to form pressurized oxidant fluid F231 which is directed through recovery heat exchanger 728 to recover heat from outlet alkaline oxide flow F841 or F842 into preheated pressurized oxidant fluid F232. A portion of such preheated oxidant fluid F232 may be delivered to the combustor 190. This pressurized preheated air F232 may be delivered to the combustor 190 along with (or instead of) pressurized oxidant fluid F202 or preheated oxidant fluid F204. Similarly heat may be recovered via preheater 727 from combusting a portion of hydrocarbon fuel F300, F301, F302, F303, and/or F304.

Calciner Pressurizer: Per FIG. 1, in some embodiments, a calciner blower or pressurizer 415 may be used to pressurize calciner pressurizer flow F146 and deliver a pressurizing fluid F147 to calciner 154, such as into the calciner bottom inlet manifold 282 or the calciner outlet 155 or discharger 232. Calciner pressurizer 415 may be operable to pressurize an inlet pressurizing fluid F146 selected from one of a fluid F145 comprising $CO_2$, and a portion of cooled expanded flue gas F794 selectable by valve 230. Pressurized fluid F147 may be used to recover heat from pressurized or depressurized outlet alkaline oxide F841 or F842 via recovery heat exchanger 728 prior to delivery to the calciner bottom fluid inlet manifold 282.

Comminutors and buffer stores: As depicted in FIG. 1 in some configurations, fuel F300 comprising natural gas may be stored in a buffer fuel store 881 and then delivered to pressurizer 419 or equivalent as fuel F303, and fed into the combustor 190 as pressurized fuel F304. Buffer bulk fuel stores 881 may comprise solid fuel F300 such as coal. In some configurations, stored fuel F301 comprising coal from buffer fuel store 881 may be processed in a crusher, grinder or pulverizer 872 and the pulverized fuel F302 may be stored in a pulverized fuel buffer store 882. From pulverized fuel buffer store 882, pulverized fuel F303 may be pressurized by pressurizer 419 which may optionally comprise a screw feeder, drag conveyor or lock hopper, and the pressurized pulverized fuel F304 may be fed into combustor 190, to be combusted with pressurized oxidant fluid F204.

Initial charge: In some embodiments, on startup, the lower portion of calciner 154 below the top of inflow manifold 286 may be filled with alkaline oxide. Other configurations may start with calciner 154 filled with crushed carbonate F803. After calcining begins, a portion of uncalcined crushed carbonate in the lower calciner region below intake manifold 286 may be recirculated back into inlet lock hopper 231, recirculated to buffer crushed carbonate store 884, be sold, or be disposed of.

Startup pressurization: Referring to FIG. 1, on startup, calciner pressurizer 415 may be used to pressurize the calciner 154 from atmospheric pressure to near a design operating pressure by delivering the pressurized fluid F147 to the calciner bottom inlet manifold 282, while controlling gaseous fluid flows out through upper feeder 231, discharger 232, pressurizer valve 230, and through multiway outlet valve 234 (or equivalent) to pressurizer 417. Valve 230 may be used to draw pressurizing fluid F146 from one or both of flue gas F794 and $CO_2$ comprising fluid F145, to deliver pressurizing fluid F147. In some configurations, a portion of ambient intake air F23 may be used for startup pressurizing.

Initial or startup air may purged after reaching operating temperatures. In other configurations, initial or startup air may be diluted and delivered with calcining generated CO2 and delivered.

Such startup charging beneficially increases fluid density within calciner 154 whereby increasing heat transfer of preheated or sideflow calciner fluid F150, heated calciner fluid F153, cooled outlet calciner fluid F154 and repressurized calciner inlet fluid F156 circulating in/out and through calciner 154 before the carbonate material within the calciner is hot enough to be calcined. For example, in some configurations, calciner startup pressure may be increased to one of 0.25 MPa, 0.5 MPa, or 0.75 MPa gauge depending on calciner design depth and crushed carbonate size, etc. Calciner pressurizer 415 may be used to compensate for gas losses through one or more of lock hoppers or pressure feeders 231, and/or alkaline dischargers 232 and particulate 236, multiway fluid recirculating/delivery outlet 234, refractory heat exchanger 726 and recovery heat exchanger 728, and calciner system leaks.

Managing calciner operating pressure: Referring to FIG. 1, once calciner 154 is heated to calcining temperatures and begins to generate CO2 by calcining carbonate, the pressure within calciner 154 may be controlled by the rate of withdrawal of fluid F157 via delivery pressurizer 417 and delivery of enhancing fluid F158 to precipitator or particulate cleaner 527 and discharge of cleaned enhancing fluid F159 through delivery compressor 202 as pressurized enhancing fluid F622 through enhancing injection wells 624.

Calciner pressure may be monitored by pressure transducers in one or more of process monitors 853, 854, 855, 857 and 858 measuring fluids in manifolds 282, 284, 286 and 288 respectively. e.g., a fitted model, or a mean of two or more of these monitored pressures may be used. In some configurations the pressure and discharge rate of fluid F157 may be controlled by enhancing fluid delivery compressor 202, with or without delivery pressurizer 417. e.g., by adjusting one or more of compressor speed, guide vanes, intake valve and outlet valve.

Managing calciner fluid flow rate: The flow rate of calciner enhancing fluid through the calciner may be controlled by the rate at which recirculating repressurizer 416 withdraws fluid F155 from calciner top outlet manifold 288 via multiway outlet/recirculating valve 234 (or equivalent) and delivers repressurized calciner inlet fluid F156 into the calciner bottom inlet manifold 282. With recirculating repressurizer 416 pressurizing cooled calciner fluid F155, and/or pressurizer 417 pressurizing enhancing fluid F157, operating pressures within calciner 154 are expected to be highest in fluid inlet manifold 282 and lowest in fluid outlet manifold 288.

Depending on operating parameters and crushed carbonate properties, the pressure at calciner inlet 153 may be near atmospheric pressure in some configurations, which may require little or no pressurizing of crushed carbonate F803 in carbonate lock hopper or feeder 231. Pressures higher than atmospheric pressure may be used to increase calciner fluid density and heat transfer.

In some embodiments, the controller may control an alkali pressure difference between the fluid inlet manifold and fluid outtake manifold to within an alkali pressure range to control the heat recovery fluid flow through the crushed alkaline oxide between the fluid inlet manifold and the fluid outtake manifold.

Managing calciner fluid sideflow rate: Referring to FIG. 1, the sideflow flow rate of sideflow calciner fluid F150, from outtake manifold 284 through the refractory heat exchanger 726 and back into intake manifold 286 as heated calciner fluid F153, may be controlled by adjusting blower or sideflow repressurizer 418, and the calciner pressurizer 415. e.g., by controlling the speed of blower or sideflow repressurizer 418 and calciner pressurizer 415 with a variable frequency blower power controller. Other configurations may vary guide vanes, blade angle, and/or control blower inlet or outlet area.

Controller 598 may be used to control sideflow repressurizer 418 to adjust the flow rates of sideflow calciner fluid F150 and heated calciner fluid F153 to control the pressure differential between outtake manifold 284 and intake manifold 286 to below a prescribed low differential pressure limit. e.g., the differential pressure limit may be selected as less than 0.03%, 0.1%, 0.3%, 1%, or 3% of the gauge pressure monitored by one of process monitors 853, 854, 857 and 858, between ambient or atmospheric pressure and one of calciner manifolds 282, 284, 286 and 288. In some configurations, such gauge pressure may be about 20 kPa, 50 kPa, or 80 kPa (0.2 atm, 0.5 atm or 0.8 atm) depending on one or more of the size of the intake carbonate F803 and the calciner 154 configuration.

As shown by short dashed flow lines of inflowing calciner inlet fluid F156 and outflowing outlet calciner fluid F154 in FIG. 4, such flow control by controller 598 may be used to maintain the sideflow calciner fluid F150 and heated calciner fluid F153 at about the same pressure. This maintains sideflow calciner fluid F150 outflow and heated calciner fluid F153 inflow in about stagnant opposition as schematically shown by the stagnation boundary SB (short-long dashed dividing line) between fluids F150 and heated calciner F153. This facilitates reducing or minimizing any short circuit or sideflow flow of sideflow calciner fluid F150 directly between outtake manifold 284 and intake manifold 286.

Managing combustion gas pressure: Referring to FIG. 1, in some configurations, the mean combustion side fluid pressure in refractory heat exchanger 726 may be set by configuring a mean pressure ratio, of an inlet pressure ratio of compressor 201 (of a pressure of pressurized oxidant fluid F202 to a pressure of inlet oxidant fluid F200,) and of an outlet pressure ratio of expander 601, (of pressurized exhaust gas F793 to expanded exhaust gas F794). This may further account account for fluid flow pressure drops in the combustor, refractory heat exchanger 726, preheater 727 and associated ducting.

In some configurations, controlling the indirect heating with refractory heat exchanger 726 may comprise using controller 598 to control a heat exchanger temperature difference, between a combustion fluid side intake temperature and a sideflow fluid side outlet temperature, to be less than a prescribed differential heat exchanger temperature limit. One or more heat exchanger temperatures may be radiatively measured. The prescribed differential heat exchanger temperature limit may be less than one of 0.03%, 0.1%, 0.3%, 1%, or 3% of the difference between a temperature of the hot combustion gas F791, and a temperature of the outlet calcining fluid F154.

The combustion side temperature may be a temperature of hot combustion gas F791 in manifold M1 as measured by process monitor 844, a temperature of cooled combustion gas F792 in manifold M2 as monitored by pressure monitor 845, or a mean of those hot and cooled combustion gas temperatures. The sideflow temperature may be a temperature of heated calciner fluid F153 in intake manifold 286 as measured by monitor 857, or of pressurized calciner fluid F152 in manifold M3 as measured by process monitor 856, in outtake manifold 284 as measured by outtake process monitor 854 (or by a similar monitor in outtake manifold M4), or a mean temperature of the repressurized calciner fluid temperature and the heated calciner fluid temperature.

In some configurations, such as when using refractory heat wheels for refractory heat exchanger 726, the combustion side pressure may be configured and/or controlled to be similar to the calciner sideflow fluid side pressure. e.g., by controlling a regenerative differential pressure as a difference between a mean combustion side pressure and a mean sideflow side pressure, to within a prescribed regenerative differential pressure limit. The combustion side pressure may be a mean of a pressure of hot combustion gas F791 in manifold M1 as measured by process monitor 844 and a pressure of cooled combustion gas F792 in manifold M2 as monitored by pressure monitor 845. The mean sideflow pressure may be a mean of two or more of the pressure of pressurized calciner fluid F152 in inlet manifold M3 as measured by process monitor 856, a pressure of heated calciner fluid F153 into the intake manifold 286, outtake fluid F150 pressure in outtake manifold 284 as measured by outtake process monitor 854 and a pressure monitor in outlet manifold M4 (not shown). The regenerative differential pressure may be controlled to within a regenerative differential limit of less than 0.03%, 0.1%, 0.3%, 1%, or 3% of the gauge pressure above atmospheric pressure.

Per FIG. 1, one or both of the inlet pressure ratio of pressurizer 201 and outlet pressure ratio of expander 601 may be adjusted, such as by adjusting a blower speed by the shaft speed of prime mover 401, by adjusting the frequency of a variable frequency power controller driving one or both of pressurizer 201 and expander 601, by varying blower or expander vane angles, or by adjusting inlet or outlet area etc. such inlet and outlet pressure ratios may be adjusted to compensate for varying atmospheric pressure such as measured by process monitor 841.

Managing combustion gas flow rate: Further referring to FIG. 1, a flow rate of combustion gas F791 through refractory heat exchanger 726 may be configured or controlled by controlling a pressure ratio difference, between the inlet pressure ratio of pressurizer 201 and the outlet pressure ratio of expander 601. In some configurations, a flow ratio of combustion gas flow rate, from combustion side inlet manifold M1 to combustion side outlet manifold M2, to the sideflow calcining fluid flow rate within refractory heat exchanger 726 of sideflow pressurized calciner fluid F152 into sideflow side inlet manifold M3 to heated sideflow fluid F153 out of sideflow side outlet manifold M4, may be configured and/or controlled to be within a prescribed flow ratio range.

In some configurations, a pressure differential between the pressurized oxidant fluid and the combustion exhaust fluid may be controlled to within a prescribed combustion fluid pressure range, to control the combustion fluid flow rate through the refractory heat exchanger, while constraining the combustion fluid pressure to less than an emergency combustion fluid pressure limit, and while constraining the combustion fluid temperature to less than an emergency combustion fluid temperature limit.

The combustion gas flow rate of combustion gas F791 or cooled combustion fluid F792 may be adjusted to account for variations in calcining rate. e.g., to accommodate one or more variations in atmospheric pressure, ambient temperature, ambient humidity, the flow rate of combustion gas F791, the temperature of combustion gas F791, a flow rate of crushed carbonate F805, a crushed carbonate mean size, and a crushed carbonate composition.

In some configurations, such as when using a heat wheel heat exchanger, the difference between the combustion gas F791 flow rate and calciner fluid F153 flow rate may be configured and/or controlled to less than a prescribed differential flow rate limit. Flow rates may be monitored by one or more flow rate transducers among the process monitors within combustion flow loop from process monitors 841 to 846, and in the calciner fluid loop from process monitors 853 to 858. In other configurations, the difference between the differential pressure drop from manifold M1 to manifold M2 and the differential pressure drop from manifold M3 to manifold M4, may be controlled to be less than a prescribed pressure difference.

Calcining fluid flow: In some embodiments, the controller 598 may control a calcining pressure difference between the fluid intake manifold 286 and fluid outlet manifold 288 to within a prescribed pressure range, to control a combined calcining flow, of calcining fluid plus CO2 being generated, through the crushed alkaline carbonate between the fluid intake manifold 284 and the fluid outlet manifold 288.

Temperature control: In some embodiments, controller 598 may be configured to control the heated fluid temperature of one of combustion gas F791, cooled combustion gas F792, and heated calciner fluid F153, as measured by one or more of process monitors 844, 845, and/or 857. e.g., controller 598 may be configured to control the relative flow of fuel fluid F304 and/or F232, oxidant fluid F204, and diluent comprising recirculated diluent F631.

The heated fluid temperature may be controlled to be greater than a prescribed calcining temperature, and less than a inflow design temperature for refractory heat exchanger 726. e.g., higher reactivity lime may be made by calcining between 850 degrees C. and 1500 degrees C., or between 900 degrees C. and 1400 degrees C., or between 950 degrees C. and 1350 degrees C., or between 1000 degrees C. and 1300 degrees C., or between 1100 degrees C. and 1250 degrees C. In some configurations calcining may be between 850 degrees C. to 1200 degrees C. In other configurations, temperature ranges from 1200 degrees C. to 1800 degrees C. or between 1300 degrees C. and 1700 degrees C. etc. may be used to make hard burnt alkaline oxide. The process may be controlled to maintain the temperature of the calciner inlet fluid F156 at the lower inlet manifold above the carbonation temperature of the outlet alkaline oxide F841.

Temperature trend control: In some configurations, the rate of change in the temperature of calciner 154 may be controlled within design limits of the allowable rate of increase in temperature based on the refractory insulation used and maintenance guidelines. e.g., the heating rate on startup. In other configurations, the rate of cooling after ceasing calcining may be controlled within similar thermal design limits for insulating refractory materials. In further configurations, during startup one or more of heated combustion gas F791, cooled combustion gas F792 or F793 may be redirected from combustor into one or both of inlet manifold 282 and intake manifold 286 in calciner 154 while heating to calcining temperatures. Correspondingly, portions of one or more of exhaust fluid F794 and ambient air F23 may be used to facilitate calciner cooling within prescribed temperature trend limits.

Carbonate flow rate: In some configurations, one or both of lock hopper or pressurized feeder 231 and respective lock hopper or depressurizer 232 may be configured and/or controlled to adjust the flow rate of the unpressurized carbonate flow F803 or the pressurized carbonate F805 into the calciner 154, and/or the flow rate of pressurized alkaline oxide F841 or unpressurized alkaline oxide F842 out of the calciner 154.

The carbonate delivery rate may be controlled to be not greater than a prescribed calcining rate corresponding to a desired or prescribed CO2 delivery rate. Furthermore, the carbonate flow may be controlled to be not greater than one of an emergency carbonate supply rate; or controlling alkaline oxide discharge rate to not exceed an emergency alkaline oxide discharge rate, or a design alkaline oxide discharge rate.

The carbonate delivery rate may be controlled to within a prescribed carbonate delivery range stoichiometrically proportional to a prescribed CO2 delivery range, while controlling the heated calcining fluid temperature and delivery rate to equal to or greater than a heating rate sufficient to calcine the carbonate at the carbonate delivery rate. Furthermore, the calcining fluid temperature and delivery rate may be controlled to less than an emergency delivery rate and emergency temperature for combustion fluid through the refractory heat exchanger.

One or more of these carbonate and alkaline oxide flows may be controlled to be not greater than the calcining capacity based on the enthalpy difference between heated calciner fluid F153 into calciner 154 and cooled calciner fluid F154 flowing out of calciner 154. within a prescribed design refractory heat exchanger temperature limit and a prescribed calciner pressure operating limit.

In some configurations, one or more of the carbonate flows F803 and F805, alkaline oxide flows F841 or F842, along with the enthalpy rate for sideflow calciner fluid F150 or heated calciner fluid F153, may be controlled to generate a prescribed CO2 flow rate in one or more of the enhancing fluid delivery flows F157, F158, F159, F622 and F624 above a prescribed recirculating calciner fluid outlet flow rate F155, or recirculating calciner fluid inlet flow rate F156. This prescribed CO2 flow rate may vary with time depending on maintaining enhancing fluid delivery rates within geological fluid delivery safety limits for one or more of these enhancing fluid flows. In further configurations, a plurality of cyclones or a "precalcining" kiln may be used to recover heat from alkaline oxide F841 or F842 discharged from calciner 154. In other configurations, the calciner may be configured as a parallel flow regenerative shaft kiln. In further configurations an annular calciner configuration may be used applying similar principles.

Generalization

From the foregoing description, it will be appreciated that a novel approach for generating an enhancing fluid comprising CO2 to enhance hydrocarbon recovery has been disclosed using one or more methods described herein. While the components, techniques and other aspects of the invention have been described with a certain degree of particularity, it is manifest that many changes may be made in the specific designs, constructions, and methodology herein above described without departing from the spirit and scope of this disclosure. One or more of CO2, gas, water, viscosity thickeners, Gas Alternating Water, and CO2 Alternating Water may be used during one or more of primary, secondary, tertiary, and/or quaternary enhanced production, in new, producing, mature, and/or depleted oil fields, and brownfield and/or greenfield residual oil zones (brownfield ROZ, greenfield ROZ).

Where specific parameters such as mining, crushing, calcining, hydrocarbon producing, and hydrocarbon recovery locations, fluid compositions, flow rates, and operations are given, they are generally for illustrative purpose and are not prescriptive. Of course, as the mechanical, petroleum, and chemical process engineer will appreciate, other suitable components, and configurations may be efficaciously utilized in accordance with the nature of the mining, crushing, calcining, processing and hydrocarbon recovery machinery utilized and for which specific flows, compositions, pressures, and locations are desired. Appropriate components and configurations may be utilized, as needed or desired, giving due consideration to the goals of achieving one or more of the benefits and advantages as taught or suggested herein.

While the components, techniques and aspects of the invention have been described with a certain degree of particularity, it is manifest that many changes may be made in the specific designs, constructions and methodology herein above described without departing from the spirit and scope of this disclosure. Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

Although the present disclosure has been described in relation to particular embodiments thereof, many other variations and modifications and other uses will become apparent to those skilled in the art. It is preferred, therefore, that the present disclosure be limited not by the specific disclosure herein, but only by the appended claims.

What is claimed is:

1. A calciner system to deliver enhancing fluid comprising CO2, comprising:
    a calciner with a pressure vessel with a refractory insulating lining, having in descending sequence,
        a feeder operable to feed crushed alkaline carbonate into the calciner;
        a fluid outlet manifold to withdraw outlet calciner fluid near the carbonate feeder;
        a fluid intake manifold to receive heated sideflow calciner fluid;
        a fluid outtake manifold to deliver preheated sideflow calciner fluid to be heated;
        a fluid inlet manifold to recirculate outlet calciner fluid from the fluid outlet manifold; and
        a discharger operable to discharge alkaline oxide from the calciner;
    a sideflow pressurizer operable to receive and repressurize preheated sideflow calciner fluid from the fluid outtake manifold and deliver heated sideflow calciner fluid to the fluid intake manifold;
    a recirculating pressurizer operable to receive and repressurize and recirculate outlet calciner fluid, from the fluid outlet manifold and deliver it to the fluid inlet manifold;
    a delivery pressurizer operable to pressurize and deliver enhancing fluid comprising CO2 formed by calcining from the fluid outlet manifold;
    a fuel delivery system having a fuel pressurizer operable to deliver pressurized fuel fluid comprising a fuel;
    an oxidant delivery system having an oxidant pressurizer operable to deliver pressurized oxidant fluid comprising an oxidant;
    a combustor operable to receive, mix, and combust fuel fluid and oxidant fluid, thereby forming a combustion fluid;
    one of a regenerative refractory heat exchanger and a recuperative refractory heat exchanger, in fluid communication with the combustor and configured to exchange heat between the combustion fluid and the sideflow calciner fluid, in serial fluid communication with the fluid outtake manifold, the sideflow pressurizer, and the fluid intake manifold;

a plurality of process fluid monitors to monitor a multiplicity of combustor, refractory heat exchanger, and calciner fluids; and a controller operable to monitor the plurality of process fluid monitors and to control a plurality of fluid pressurizers, a heated sideflow calciner fluid temperature, and one of the feeder and the discharger;

wherein the calcining system is operable to combust fuel, calcine crushed carbonate, discharge alkaline oxide, and deliver a pressurized enhancing fluid comprising $CO_2$ formed thereby.

2. The calciner system of claim 1 wherein the sideflow pressurizer comprises an aerodynamic member, configured as a rotor or a stator, configured with one of a thermal barrier coating, internal coolant flow delivery, and external coolant flow delivery, sufficient to repressurize the sideflow calciner flow.

3. The calciner system of claim 1, wherein a particle separator is configured between the sideflow outtake manifold and the refractory heat exchanger sideflow side inlet.

4. The calciner system of claim 1, wherein a particle separator is configured between the fluid outlet manifold and the delivery pressurizer.

5. The calciner system of claim 1, wherein the regenerative heat exchanger comprises a combustor fluid inlet manifold connected to the combustor, a combustor fluid outlet manifold in communication with an exhaust, a sideflow inlet manifold in fluid communication with the fluid outtake manifold, and a sideflow outlet manifold in fluid communication with the fluid intake manifold.

6. The calciner system of claim 1, further comprises a calciner pressurizer and valve in fluid communication with one of the fluid inlet manifold and discharger, operable to select and compress one of a fluid comprising carbon dioxide and a cooled exhaust fluid.

7. The calciner system of claim 1, further comprising an expander operable to expand cooled combustor fluid from the heat exchanger, and wherein the controller is operable to control a pressure difference between the combustion side and sideflow side of the heat exchanger.

8. The calciner system of claim 1, further comprising a flue gas recirculating pressurizer operable to repressurize a portion of cooled combustion gas downstream of the heat exchanger and deliver it as a thermal diluent into the combustor.

9. The calciner system of claim 1, further comprising a heat recovery heat exchanger configured to exchange heat from alkaline oxide to preheat an oxidant fluid for delivery to the combustor.

10. The calciner system of claim 1, further comprising a heat recovery heat exchanger in fluid communication with the downstream combustion side of the refractory heat exchanger to recover heat from cooled combustion fluid alkaline oxide to preheat oxidant fluid upstream of the combustor.

11. The calciner system of claim 1, further comprising a storage system for one of crushed carbonate and fuel, sufficient for four months supply.

12. The calciner system of claim 1, wherein the process monitors comprise an outtake process monitor configured to monitor preheated sideflow calciner fluid in the outtake manifold, and an intake process monitor configured to monitor heated sideflow calciner fluid in the calciner fluid intake manifold.

13. The calciner system of claim 1, wherein the process monitors comprise an outlet process monitor configured to monitor calciner outlet fluid in the recirculating outlet manifold, an inlet process monitor is configured to monitor recirculating calciner fluid in the calciner fluid inlet manifold.

14. The calciner system of claim 1, wherein the calciner is configured to accommodate one of the crushed carbonate and the alkaline oxide forming an angle of repose across one of the fluid outlet manifold, the fluid intake manifold, the fluid outtake manifold and the fluid inlet manifold.

15. The calciner system of claim 1, further comprising a hydrocarbon enhancing system to deliver enhancing fluid to a hydrocarbon resource and recover a produced fluid, a hydrocarbon separation battery to separate, from the produced fluid, a recovered $CO_2$ fluid, a gaseous hydrocarbon fluid, a liquid hydrocarbon, and an aqueous fluid, wherein combusting a portion of the gaseous hydrocarbon in the combustor, and recycling a portion of the recovered $CO_2$ fluid to the hydrocarbon resource.

* * * * *